United States Patent
Meier et al.

(10) Patent No.: US 10,047,176 B2
(45) Date of Patent: Aug. 14, 2018

(54) MULTI-REACTOR SLURRY POLYMERIZATION PROCESSES WITH HIGH ETHYLENE PURITY

(71) Applicant: Basell Polyolefine GmbH, Wesseling (DE)

(72) Inventors: Gerhardus Meier, Frankfurt (DE); Elke Damm, Bad Vilbel (DE); Reinhard Kuehl, Bornheim (DE); Rodrigo Carvajal, Bonn (DE); Phil Pyman, Bad Soden (DE)

(73) Assignee: Basell Polyolefine GmbH, Wesseling (DE)

( * ) Notice: Subject to any disclaimer, the term of this patent is extended or adjusted under 35 U.S.C. 154(b) by 0 days.

(21) Appl. No.: 15/503,299

(22) PCT Filed: Aug. 13, 2015

(86) PCT No.: PCT/EP2015/068633
§ 371 (c)(1),
(2) Date: Feb. 10, 2017

(87) PCT Pub. No.: WO2016/023973
PCT Pub. Date: Feb. 18, 2016

(65) Prior Publication Data
US 2018/0022842 A1    Jan. 25, 2018

(30) Foreign Application Priority Data
Aug. 14, 2014   (EP) .................................... 14180976

(51) Int. Cl.
*C08F 110/02*   (2006.01)
*C08F 2/14*   (2006.01)
(Continued)

(52) U.S. Cl.
CPC ........ *C08F 110/02* (2013.01); *C08F 2500/05* (2013.01)

(58) Field of Classification Search
CPC .......... C08F 2/14; C08F 10/02; B01J 19/1862
(Continued)

(56) References Cited

U.S. PATENT DOCUMENTS 3,404,101 A * 10/1968 Weisang .................. B01J 23/86
502/314
7,427,649 B2   9/2008 Berthold et al.
(Continued)

FOREIGN PATENT DOCUMENTS

| | | |
|---|---|---|
| JP | H10195135 A | 7/1998 |
| JP | 2004-531386 A | 10/2004 |

(Continued)

OTHER PUBLICATIONS

PCT International Search Report & Written Opinion dated Nov. 18, 2015 for PCT/EP2015/068633.

*Primary Examiner* — Fred M Teskin

(57) ABSTRACT

A slurry polymerization process for the preparation of polyethylene in a reactor cascade of two or more polymerization reactors including the steps of feeding to a polymerization reactor amounts of ethylene, of a Ziegler catalyst, of fresh aluminum alkyl and of a diluent; feeding the slurry product withdrawn from the polymerization reactor to a second polymerization reactor; and feeding additional amounts of ethylene and of diluent wherein the ethylene is first passed through an ethylene purification unit, which reduces at least the concentration of carbon monoxide, carbon dioxide, oxygen, acetylene and water contained in the ethylene, before it is fed to the two or more polymerization reactors of the reactor cascade.

16 Claims, 1 Drawing Sheet

(51) Int. Cl.
*C07C 7/13* (2006.01)
*C07C 11/04* (2006.01)

(58) Field of Classification Search
USPC .......................................... 526/65; 585/809
See application file for complete search history.

(56) References Cited

U.S. PATENT DOCUMENTS

| | | |
|---|---|---|
| 8,557,931 B2 | 10/2013 | Brita et al. |
| 9,051,458 B2 | 6/2015 | Berthold et al. |
| 9,447,206 B2 | 9/2016 | Dams et al. |
| 2004/0176653 A1 | 9/2004 | Vorberg et al. |
| 2007/0293638 A1 | 12/2007 | Hagerty et al. |
| 2009/0105422 A1* | 4/2009 | Berthold ................ C08F 10/00 525/240 |
| 2011/0027156 A1* | 2/2011 | Eisinger ................ B01D 15/00 423/219 |

FOREIGN PATENT DOCUMENTS

| | | |
|---|---|---|
| JP | 2006-511676 A | 4/2006 |
| JP | 2009-508975 A | 3/2009 |
| JP | 2012-519217 A | 8/2012 |
| JP | 2013-122031 A | 6/2013 |
| KR | 20080106322 A | 12/2008 |
| WO | WO 2013/154907 A2 | 10/2013 |

* cited by examiner

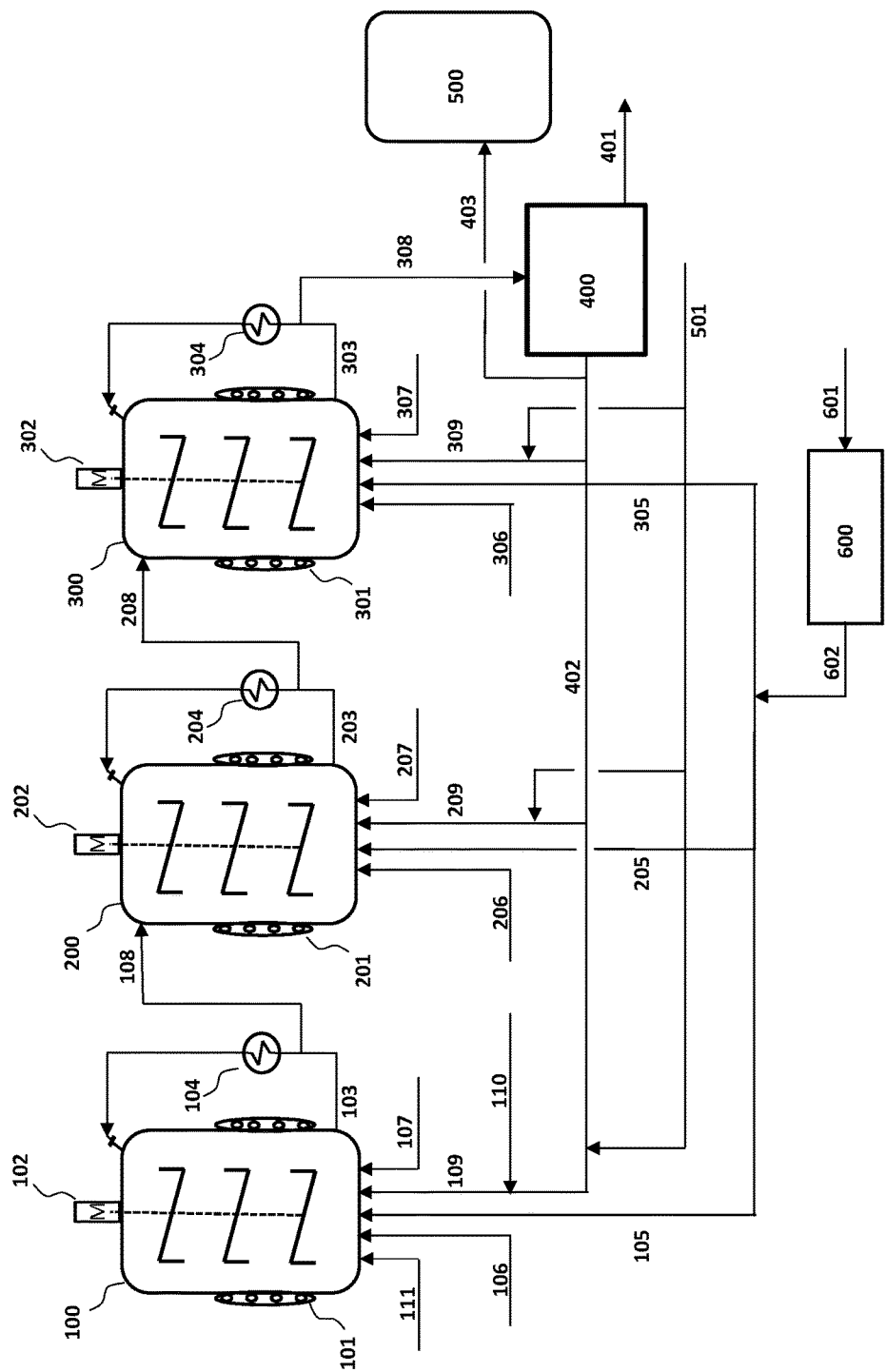

ically, the present disclosure relates to
a process for ethylene polymerization. In particular, the
present disclosure relates to a multi-reactor slurry polymerization process using high purity ethylene to produce multimodal polyethylene.

BACKGROUND OF THE INVENTION

In ethylene slurry polymerization processes, diluents such as hexane are used to dissolve the ethylene monomer, comonomers, and hydrogen. The monomer(s) are polymerized with a catalyst.

In some multi-reactor cascade processes, monomer(s), hydrogen, catalyst and diluent are fed into a first reactor where a slurry forms from the polymer particles contained within the diluent and unreacted monomer. The reactors can be operated in parallel or in series, and the types/amounts of monomer and conditions can be varied in each reactor to produce a variety of polyethylene materials, including unimodal (molecular weight distribution) or multimodal polyethylene material.

Ziegler type catalysts have been used in ethylene polymerization processes. These catalysts use aluminum alkyl compounds as co-catalyst activators to activate titanium or vanadium sites on the catalyst. The amount of co-catalyst present in the reactor affects the yields and selectivity of the ethylene slurry polymerization process.

Various compounds, such as oxygen-containing polar molecules, can poison Ziegler type catalysts, thereby degrading yields and selectivity. These compounds can be contained as impurities in various feeds to the polymerization such as in the monomer(s), in the diluent, or in other feed streams.

A need exists for multi-reactor ethylene slurry polymerization processes in the production of multimodal polyethylenes to (i) minimize the adverse effects of catalyst poisons on reactor yields and selectivity and (ii) ensure that polyethylenes of constant structure and composition are produced in each polymerization reactor.

SUMMARY OF THE INVENTION

In a general embodiment, the present disclosure provides a multi-reactor slurry polymerization process for the preparation of polyethylene in a reactor cascade of two or more polymerization reactors.

In a general embodiment, the present disclosure provides a slurry polymerization process for the preparation of polyethylene in a reactor cascade of two or more polymerization reactors including the steps of:

a) to a first polymerization reactor, feeding a first set of components made from or containing
  (i) a first amount of ethylene,
  (ii) a first amount of a Ziegler catalyst,
  (iii) a first amount of a fresh aluminum alkyl, and
  (iv) a first amount of a diluent;
b) contacting the first set of components in the first polymerization reactor at a reactor temperature from about 60° C. to about 95° C. and a reactor pressure from about 0.15 MPa to about 3 MPa, thereby forming a first slurry product made from or containing particulate polyethylene and a suspension medium;
c) withdrawing the first slurry product from the first polymerization reactor;
d) to a second polymerization reactor, feeding a second set of components made from or containing
  (i) the first slurry product,
  (ii) a second amount of ethylene, and
  (iii) a second amount of diluent;
e) contacting the second set of components in the second polymerization reactor at a reactor temperature from about 60° C. to about 95° C. and a reactor pressure from about 0.15 MPa to about 3 MPa, thereby forming a second slurry product made from or containing particulate polyethylene and a suspension medium; and
f) withdrawing the second slurry product from the second polymerization reactor,
wherein (i) prior to passing through an ethylene purification unit, the ethylene contains an impurity selected from the group consisting of carbon monoxide, carbon dioxide, oxygen, acetylene, and water and (ii) before the ethylene is fed to the two or more polymerization reactors of the reactor cascade, the ethylene is passed through an ethylene purification unit and the concentration of the impurity is reduced.

In some embodiments, the first set of components, the second set of components, or both may further include an amount of hydrogen or an amount of one or more $C_3$ to $C_{10}$ alpha-olefins.

In some embodiments, the process further includes the steps of:

g) to a third polymerization reactor, feeding a third set of components made from or containing
  (i) the second slurry product,
  (ii) a third amount of ethylene, and
  (iii) a third amount of diluent;
h) contacting the third set of components in the third polymerization reactor at a reactor temperature from about 60° C. to about 95° C. and a reactor pressure from about 0.15 MPa to about 3 MPa, thereby forming an additional amount of polyethylene in the slurry product made from or containing particulate polyethylene and a suspension medium; and
i) withdrawing the third slurry product from the third polymerization reactor.

In some embodiments, the first set of components, the second set of components, the third set of components, or any combination thereof may further include amounts of hydrogen or amounts of one or more $C_3$ to $C_{10}$ alpha-olefins.

In some embodiments, the process further includes post-reactor steps. In one set of embodiments, the post-reactor steps include:

j) feeding the second slurry product to a post reactor,
k) maintaining the second slurry product in the post reactor at a reactor temperature from about 60° C. to about 95° C. and a reactor pressure from about 0.15 MPa to about 3 MPa, thereby forming a modified second slurry product made from or containing an additional amount of polyethylene and a suspension medium; and l) withdrawing the modified second slurry product from the post reactor.

In another set of embodiments, the post-reactor steps follow the use of a third polymerization reactor and include:

m) feeding the third slurry product to a post reactor, n) maintaining the third slurry product in the post reactor at a reactor temperature from about 60° C. to about 95° C. and a reactor pressure from about 0.15 MPa to about 3 MPa, thereby forming a modified third slurry product made from or containing an additional amount of polyethylene and a suspension medium; and o) withdrawing the modified third slurry product from the post reactor.

In some embodiments, the ethylene fed to the polymerization reactors has a carbon monoxide concentration of at most about 0.09 ppm by volume.

In some embodiments, the ethylene fed to the polymerization reactors has a carbon dioxide concentration of at most about 0.9 ppm by volume.

In some embodiments, the ethylene fed to the polymerization reactors has an oxygen concentration of at most about 0.9 ppm by volume.

In some embodiments, the ethylene fed to the polymerization reactors has an acetylene concentration of at most about 2.7 ppm by volume.

In some embodiments, the ethylene fed to the polymerization reactors has a water concentration of at most about 1.8 ppm by volume.

In some embodiments, the ethylene purification includes a first process step including contacting the ethylene with a catalyst reducing the concentration of oxygen in the ethylene, a second process step including contacting the ethylene with a catalyst reducing the concentration of carbon monoxide in the ethylene, a third process step including contacting the ethylene with molecular sieves, and a fourth process step including contacting the ethylene with an activated alumina.

In some embodiments, one or more $C_3$ to $C_{10}$ alpha-olefins are fed to at least one of the polymerization reactors and the $C_3$ to $C_{10}$ alpha-olefins are first passed through an olefin purification unit, which reduces at least the concentration of carbon monoxide, carbon dioxide, oxygen, acetylene and water contained in the olefins, before being fed to the two or more polymerization reactors of the reactor cascade.

In some embodiments, the aluminum alkyl is trimethylaluminum, triethylaluminum, tri-isobutylaluminum, isoprenylaluminum, or tri-n-hexylaluminum.

In some embodiments, the diluent can be fresh diluent or separated from the particulate polyethylene in a reactor slurry.

In a general embodiment, the present disclosure provides polyethylene has a density in the range of from 0.935 g/cm$^3$ to 0.970 g/cm$^3$.

In a general embodiment, the present disclosure provides a bimodal or multimodal polyethylene.

In a general embodiment, the present disclosure provides a process for preparing films, pipes, or blow-molded articles from polyethylene.

While multiple embodiments are disclosed, still other embodiments will become apparent to those skilled in the art from the following detailed description. As will be apparent, certain embodiments, as disclosed herein, are capable of modifications in various obvious aspects, all without departing from the spirit and scope of the claims as presented herein. Accordingly, the drawing and detailed description are to be regarded as illustrative in nature and not restrictive.

BRIEF DESCRIPTION OF THE DRAWINGS

The following figure illustrates a preferred embodiment of the subject matter disclosed herein. The claimed subject matter may be understood by reference to the following description taken in conjunction with the accompanying figure, in which like reference numerals identify like elements, and in which:

FIG. 1 provides a flow diagram of a multi-reactor ethylene slurry cascade polymerization process for producing multimodal polyethylene.

DETAILED DESCRIPTION OF THE INVENTION

The present invention now will be described more fully hereinafter. However, this invention can be embodied in many different forms and should not be construed as limited to the embodiments set forth herein; rather, these embodiments are provided so that this disclosure will satisfy applicable legal requirements. As such, it will be apparent to those skilled in the art that the embodiments can incorporate changes and modifications without departing from the general scope. It is intended to include all the modifications and alterations in so far as the modifications and alterations come within the scope of the appended claims or the equivalents thereof.

As used in this specification and the claims, the singular forms "a," "an," and "the" include plural referents unless the context clearly dictates otherwise.

As used in this specification and the claims, the terms "comprising," "containing," or "including" mean that at least the named compound, element, material, particle, or method step, etc., is present in the composition, the article, or the method, but does not exclude the presence of other compounds, elements, materials, particles, or method steps, etc., even if the other such compounds, elements, materials, particles, or method steps, etc., have the same function as that which is named, unless expressly excluded in the claims. It is also to be understood that the mention of one or more method steps does not preclude the presence of additional method steps before or after the combined recited steps or intervening method steps between those steps expressly identified.

Moreover, it is also to be understood that the lettering of process steps or ingredients is a means for identifying discrete activities or ingredients and the recited lettering can be arranged in any sequence, unless expressly indicated.

For the purpose of the present description and of the claims which follow, except where otherwise indicated, numbers expressing amounts, quantities, percentages, and so forth, are to be understood as being modified by the term "about". Also, ranges include any combination of the maximum and minimum points disclosed and include any intermediate ranges therein, which may or may not be specifically enumerated herein.

Definitions

In the present description, the term "first" refers to the order in which a particular species is presented and does not necessarily indicate that a "second" species will be presented. For example, "first polymer composition" refers to the first of at least one polymer composition. The term does not reflect priority, importance, or significance in any other way. Similar terms used that can be used herein include "second," "third," "fourth," etc.

In the present description, the term "multimodal" refers to a polymer compositions containing multiple polymer components. Each component being produced in a separate reactor and differing from the other components by (a) type or amount of comonomer and (b) molecular weight distribution. The term "multimodal" as used herein shall include also "bimodal".

Testing

Density is measured according to DIN EN ISO 1183-1: 2004, Method A (Immersion). The compression molded plaques were 2 mm thickness and prepared with a defined thermal history: Pressed at 180° C., 20 MPa for 8 min with subsequent crystallization in boiling water for 30 min.

Melt Index ($MI_{21.6}$) is measured according to DIN EN ISO 1133:2005, condition G at a temperature of 190° C. under a load of 21.6 kg.

In a general embodiment, the present disclosure relates to a slurry polymerization process for the preparation of polyethylene in a reactor cascade of a first polymerization reactor and one or more subsequent polymerization reactors including the steps of:

a) to the first polymerization reactor, feeding a first set of components made from or containing
  (i) a first amount of ethylene,
  (ii) a first amount of a Ziegler catalyst,
  (iii) a first amount of an aluminum alkyl, and
  (iv) a first amount of a diluent; and
b) to the one or more subsequent polymerization reactors, feeding a subsequent set of components made from or containing
  (i) the reaction products from the prior polymerization reactor,
  (ii) an amount of ethylene and
  (iii) an amount of a diluent.

The first set of components, a subsequent set of components, or any combination thereof may further include an amount of hydrogen and an amount of $C_3$ to $C_{10}$ alpha-olefins as comonomers.

The catalyst fed to the first polymerization reactor of the cascaded multi-reactor system flows from the first polymerization reactor to the second polymerization reactor, and then to subsequent polymerization reactors within the respective reactor slurry products. The ethylene fed to the polymerization reactors is first passed through an ethylene purification unit, which reduces at least the concentration of carbon monoxide, carbon dioxide, oxygen, acetylene and water contained in in the ethylene, before it is fed to the two or more polymerization reactors of the reactor cascade.

The polyethylene slurry production process is carried out in a reactor cascade system, which means the reactors are operated in series. Such a reactor cascade system can have two, three or more polymerization reactors. In an embodiment, the process is carried out in a three-reactor cascade process operated in series.

In a specific embodiment, the present disclosure provides a slurry polymerization process for the preparation of polyethylene in a reactor cascade of two or more polymerization reactors including the steps of:

a) to a first polymerization reactor, feeding a first set of components made from or containing
  (i) a first amount of ethylene,
  (ii) a first amount of a Ziegler catalyst,
  (iii) a first amount of a fresh aluminum alkyl, and
  (iv) a first amount of a diluent;
b) contacting the first set of components in the first polymerization reactor at a reactor temperature from about 60° C. to about 95° C. and a reactor pressure from about 0.15 MPa to about 3 MPa, thereby forming a first slurry product made from or containing particulate polyethylene and a suspension medium;
c) withdrawing the first slurry product from the first polymerization reactor;
d) to a second polymerization reactor, feeding a second set of components made from or containing
  (i) the first slurry product,
  (ii) a second amount of ethylene, and
  (iii) a second amount of diluent;
e) contacting the second set of components in the second polymerization reactor at a reactor temperature from about 60° C. to about 95° C. and a reactor pressure from about 0.15 MPa to about 3 MPa, thereby forming a second slurry product made from or containing particulate polyethylene and a suspension medium; and
f) withdrawing the second slurry product from the second polymerization reactor, wherein (i) prior to passing through an ethylene purification unit, the ethylene contains an impurity selected from the group consisting of carbon monoxide, carbon dioxide, oxygen, acetylene, and water and (ii) before the ethylene is fed to the two or more polymerization reactors of the reactor cascade, the ethylene is passed through an ethylene purification unit and the concentration of the impurity is reduced.

In some embodiments, the reactor temperature of the first polymerization reactor can be in the range from about 65° C. to about 90° C. In other embodiments, the reactor is in the range from about 70° C. to about 85° C.

In some embodiments, the reactor pressure of the first polymerization reactor can be in the range from about 0.2 MPa to about 2 MPa. In other embodiments, the reactor is in the range from about 0.25 MPa to about 1.5 MPa.

In some embodiments, the reactor temperature of the second polymerization reactor can be in the range from about 65° C. to about 90° C. In other embodiments, the reactor is in the range from about 70° C. to about 85° C.

In some embodiments, the reactor pressure of the second polymerization reactor can be in the range from about 0.2 MPa to about 2 MPa. In other embodiments, the reactor is in the range from about 0.25 MPa to about 1.5 MPa.

In some embodiments, the process further includes the steps of:

g) to a third polymerization reactor, feeding a third set of components made from or containing
  (i) the second slurry product,
  (ii) a third amount of ethylene, and
  (iii) a third amount of diluent;
h) contacting the third set of components in the third polymerization reactor at a reactor temperature from about 60° C. to about 95° C. and a reactor pressure from about 0.15 MPa to about 3 MPa, thereby forming an additional amount of polyethylene in the slurry product made from or containing particulate polyethylene and a suspension medium; and
i) withdrawing the third slurry product from the third polymerization reactor.

In some embodiments, the first set of components, the second set of components, the third set of components, or any combination thereof may further include amounts of hydrogen or amounts of one or more $C_3$ to $C_{10}$ alpha-olefins.

In some embodiments, the reactor temperature of the third polymerization reactor can be in the range from about 65° C. to about 90° C. In other embodiments, the reactor is in the range from about 70° C. to about 85° C.

In some embodiments, the reactor pressure of the third polymerization reactor can be in the range from about 0.2

MPa to about 2 MPa. In other embodiments, the reactor is in the range from about 0.25 MPa to about 1.5 MPa.

In one embodiment of the process of the present disclosure, the slurry product withdrawn from the second polymerization reactor, withdrawn from the third polymerization reactor, or, if a reactor cascade of more than three polymerization reactors is employed, withdrawn from the last polymerization reactor of the reactor cascade is further fed to a post reactor. The process then further comprises the steps of:

j) feeding the specified withdrawn slurry product to a post reactor,
k) maintaining the slurry product in the post reactor at a reactor temperature from about 60° C. to about 95° C. and a reactor pressure from about 0.15 MPa to about 3 MPa, thereby forming an additional amount of polyethylene in the slurry product; and
l) withdrawing the slurry product from the post reactor.

The polymerization reaction occurring in the post reactor consumes remaining ethylene and, if present, comonomers, which have been transferred together with the slurry product from the previous polymerization reactor to the post reactor, and accordingly increases the yield of the multi-reactor slurry polymerization process.

In some embodiments, the reactor temperature of the post reactor can be in the range from about 65° C. to about 90° C. In other embodiments, the reactor is in the range from about 70° C. to about 85° C.

In some embodiments, the reactor pressure of the post reactor can be in the range from about 0.2 MPa to about 2 MPa. In other embodiments, the reactor is in the range from about 0.25 MPa to about 1.5 MPa.

The slurry product withdrawn from the last polymerization reactor of the reactor cascade may be fed to a separator, which separates the particulate polyethylene from the suspension medium. At least a part of the suspension medium separated from the slurry product in the separator may be recycled as diluent to one or more polymerization reactors of the reactor cascade.

FIG. 1 illustrates an embodiment of the presently-disclosed process, which is a three-reactor system running in series as a cascade. The polymerization is carried out in 3 polymerization reactors 100, 200 and 300. Each of the reactors has a cooling jacket 101, 201 or 301 and is equipped with a mixing unit 102, 202 or 302 including a motor, a rotating shaft and impellers.

Catalyst is fed to reactor 100 via line 111. Further, ethylene is dosed via line 105 and optionally 1-butene is dosed as comonomer via line 106 and/or hydrogen is dosed via line 107. Reactor slurry is withdrawn from reactors 100 through line 103 and routed for external cooling through cooler 104 and then back to polymerization reactor 100. Reactor slurry withdrawn form reactor 100 via line 103 is further partly transferred through line 108, which may further include a flash vessel (not shown), to reactor 200.

The polyethylene particles contained in the slurry transferred to reactor 200 include still active catalyst which continues to polymerize ethylene and, if present, comonomer in reactor 200. Accordingly, ethylene is dosed via line 205 and optionally 1-butene is dosed as comonomer via line 206 and/or hydrogen is dosed via line 207. Reactor slurry is withdrawn form reactors 200 through line 203 and routed for external cooling through cooler 204 and then back to polymerization reactor 200. Reactor slurry withdrawn form reactor 200 via line 203 is further partly transferred through line 208, which may further include a flash vessel (not shown), to reactor 300.

The polyethylene particles contained in the slurry transferred to reactor 300 include still active catalyst which continues to polymerize ethylene and, if present, comonomer in reactor 300. Accordingly, ethylene is dosed via line 305 and optionally 1-butene is dosed as comonomer via line 306 and/or hydrogen is dosed via line 307. Reactor slurry is withdrawn form reactors 300 through line 303 and routed for external cooling through cooler 304 and then back to polymerization reactor 300. Reactor slurry withdrawn form reactor 300 via line 303 is further partly transferred through line 308, which may further include a flash vessel, cooling devices and/or other vessels (not shown), to separation device 400.

In separation device 400, the suspension medium is separated from the solid particulate polyethylene. The polyethylene is directed to a finishing section via line 401 for further processing, including without limitation hydrocarbons removal and compounding. Recycled suspension medium is directly routed back to the ethylene slurry polymerization reactors 100, 200 and/or 300 through lines 402 and 109, 209 and/or 309, with excess suspension medium being routed to holding tank 500 via line 403. Fresh diluent may also be added to the suspension medium recycle lines 109, 209 and/or 309 through line 501. The fresh diluent, which can be selected from hexane or isobutane, may either be new, unprocessed diluent or purified diluent obtained from holding tank 500 that has been processed to remove impurities. Fresh aluminum alkyl is delivered to suspension medium recycle line 109 through line 110 to polymerization reactor 100.

Before being introduced into polymerization reactors 100, 200 and 300, the ethylene is first fed via line 601 into an ethylene purification unit 600, passed through purification unit 600, and then routed via line 602 to ethylene feeding lines 105, 205 and 305.

In the process of the present disclosure, the diluent fed to the polymerization reactors of the reactor cascade can either be fresh diluent or that which has been separated from the particulate polyethylene in the reactor slurry and then directly recycled, i.e., the recycled suspension medium, or combinations thereof. The fresh diluent can either be new, unprocessed material or diluent previously separated from the reactor slurry that has been processed to remove impurities such as low boiling components or waxes. Any combination of recycled suspension medium and fresh diluent may be fed to the polymerization reactors in the reactor cascade.

The suspension medium separated from the particulate polyethylene in the separator and consequently also the recycled suspension medium contains diluent, aluminum alkyl, and comonomers such as 1-butene, and waxes. The 1-butene may be present at levels of 0% to 5%. The waxes may be present in an amount from 0% to 5%.

In an embodiment, (a) the diluent fed to the first polymerization reactor of the reactor cascade system is fresh diluent and (b) the diluent fed to the subsequent polymerization reactors is recycled suspension medium. The diluent fed to the subsequent polymerization reactors can further include fresh diluent.

In one embodiment, the process uses ethylene in a slurry polymerization in the presence of a catalyst, a diluent such as hexane or isobutane, and optionally, hydrogen and one or more comonomers. The polymerization proceeds in a suspended slurry formed from polymer particles in the diluent, unreacted monomer and catalyst.

The obtained polyethylene polymers can be ethylene homopolymers or copolymers of ethylene containing up to about 40 wt. % of $C_3$ to $C_{10}$ alpha-olefins. The comonomers may be chosen from 1-butene, 1-pentene, 1-hexene, 1-octene or mixtures thereof.

The polyethylene polymers may be multimodal.

The production of multimodal polyethylene in the multi-reactor system includes polymers formed in different reactors that are mixed in the process to produce a final polymer. Catalyst and polymer flow from reactor to reactor in series.

As shown in FIG. 1, catalyst is fed to the first reactor in a series of slurry reactors, along with ethylene, diluent, an aluminum alkyl co-catalyst, and optionally hydrogen and monomers. The polymer exiting the first reactor results from the catalyst activity and selectivity in that reactor, which in turn is linked to the amount of aluminum alkyl present, the reactor temperature, pressure, and feed concentrations. However, the catalyst activity and selectivity of the catalyst in the first reactor is affected by the interaction of the catalyst, aluminum alkyl co-catalyst and poisons that may be present.

In the second and subsequent reactors, the same interaction occurs between impurities entering with the ethylene, active catalyst in the polymer, and aluminum alkyl co-catalyst, except that fresh aluminum alkyl is not added. Instead, the reactors receive the co-catalyst from the preceding reactor.

In multi-reactor cascade systems, polymerization of ethylene occurs in each of the dedicated reactors to make polymers. Each polymer has its own molecular weight. The activity of the catalyst and concentration of the aluminum alkyl co-catalyst changes within each reactor, and from reactor-to-reactor. The complexity of such systems increases as the number of reactors increase.

Different from polyethylene grades produced in a single reactor, the polymerization product of the subject multi-reactor process is the result of at least two polymerizations that target individual polymers in each reactor to achieve a desired final product property set for the final polymer. In case of preparing multimodal polyethylene compositions, for which a different polyethylene is produced in each polymerization reactor, small differences in the structure and composition of the polyethylene fractions produced in the individual polymerization reactors may result in differences in the product properties of the final polyethylene compositions.

The polyethylene polymers produced by the polymerization process may be high density polyethylene (HDPE) resins which may have a density within the range of from about 0.935 g/cm³ to about 0.970 g/cm³. In some embodiments, the density may be within the range of from about 0.94 g/cm³ to about 0.970 g/cm³. In other embodiments, the density may be within the range of about 0.945 g/cm³ to about 0.965 g/cm³.

The HDPE resin may have a melt index ($MI_{21.6}$) from about 1 g/10 min to about 100 g/10 min. In some embodiments, the melt index may be from about 1.5 g/10 min to about 50 g/10 min. In other embodiments, the melt index may be from about 2 g/10 min to about 35 g/10 min.

The HDPE resin may be an ethylene homopolymer or copolymer that comprises from about 90 wt. % to about 99.8 wt. % of recurring units of ethylene and from about 0.2 wt. % to about 10 wt. % of recurring units of a $C_3$ to $C_{10}$ alpha-olefin. The $C_3$ to $C_{10}$ α-olefins may include propylene, 1-butene, 1-hexene, 4-methyl-1-pentene, and 1-octene, and mixtures thereof.

The polymerization may be carried out using Ziegler catalysts or Ziegler-Natta catalysts made from or containing a compound of titanium or vanadium, a compound of magnesium and optionally a particulate inorganic oxide as support.

The titanium compounds may be selected from the halides or alkoxides of trivalent or tetravalent titanium, with titanium alkoxy halogen compounds or mixtures of various titanium compounds. Examples of titanium compounds are $TiBr_3$, $TiBr_4$, $TiCl_3$, $TiCl_4$, $Ti(OCH_3)Cl_3$, $Ti(OC_2H_5)Cl_3$, $Ti(O-i-C_3H_7)Cl_3$, $Ti(O-n-C_4H_9)Cl_3$, $Ti(OC_2H_5)Br_3$, $Ti(O-n-C_4H_9)Br_3$, $Ti(OCH_3)_2Cl_2$, $Ti(OC_2H_5)_2Cl_2$, $Ti(O-n-C_4H_9)_2Cl_2$, $Ti(OC_2H_5)_2Br_2$, $Ti(OCH_3)_3Cl$, $Ti(OC_2H_5)_3Cl$, $Ti(O-n-C_4H_9)_3Cl$, $Ti(OC_2H_5)_3Br$, $Ti(OCH_3)_4$, $Ti(OC_2H_5)_4$ or $Ti(O-n-C_4H_9)_4$.

In an embodiment of the present disclosure, titanium compounds may be from or contain chlorine as the halogen. In an embodiment, the titanium halides may be from or contain only halogen in addition to titanium, or may be titanium chlorides or may be titanium tetrachloride. The vanadium compounds may be vanadium halides, vanadium oxyhalides, vanadium alkoxides and vanadium acetylacetonates. In an embodiment, the vanadium compounds are in the oxidation states 3 to 5.

In the production of the solid component, at least one compound of magnesium may be used. These compounds may be halogen-comprising magnesium compounds such as magnesium halides, and in particular, chlorides or bromides; or these compounds may be magnesium compounds from which the magnesium halides can be obtained. In an embodiment of the present disclosure, the halogens are chlorine, bromine, iodine or fluorine or mixtures of two or more of the halogens, or in the alternative, the halogens are chlorine or bromine, or the halogens are chlorine.

Possible halogen-containing magnesium compounds are magnesium chlorides or magnesium bromides. Magnesium compounds from which the halides can be obtained include magnesium alkyls, magnesium aryls, magnesium alkoxy compounds or magnesium aryloxy compounds or Grignard compounds. The halogenating agents may be halogens, hydrogen halides, $SiCl_4$ or $CCl_4$. In an embodiment, chlorine or hydrogen chloride is the halogenating agent.

Examples of halogen-free compounds of magnesium are diethylmagnesium, di-n-propylmagnesium, diisopropylmagnesium, di-n-butylmagnesium, di-sec-butylmagnesium, di-tert-butylmagnesium, diamylmagnesium, n-butylethylmagnesium, n-butyl-sec-butylmagnesium, n-butyloctylmagnesium, diphenylmagnesium, diethoxymagnesium, di-n-propyloxymagnesium, diisopropyloxymagnesium, di-n-butyloxymagnesium, di-sec-butyloxymagnesium, di-tert-butyloxymagnesium, diamyloxymagnesium, n-butyloxyethoxymagnesium, n-butyloxy-sec-butyloxymagnesium, n-butyloxyoctyloxymagnesium and diphenoxymagnesium. In one embodiment, the halogen-free compounds of magnesium are n-butylethylmagnesium or n-butyloctylmagnesium.

Examples of Grignard compounds are methylmagnesium chloride, ethylmagnesium chloride, ethylmagnesium bromide, ethylmagnesium iodide, n-propylmagnesium chloride, n-propylmagnesium bromide, n-butylmagnesium chloride, n-butylmagnesium bromide, sec-butylmagnesium chloride, sec-butylmagnesium bromide, tert-butylmagnesium chloride, tert-butylmagnesium bromide, hexylmagnesium chloride, octylmagnesium chloride, amylmagnesium chloride, isoamylmagnesium chloride, phenylmagnesium chloride and phenylmagnesium bromide.

The magnesium compounds for producing the particulate solids may be di($C_1$-$C_{10}$-alkyl)magnesium compounds. In one embodiment, the Ziegler catalyst may be made from or contain a transition metal selected from titanium, zirconium, vanadium, and chromium.

The Ziegler catalyst may be added to the slurry reactor by first mixing the catalyst with the diluent used, such as hexane, in a mixing tank to form a slurry which may be pumped. The concentration of catalyst in the catalyst slurry pumped to the slurry polymerization reactor may be from about 10 mmol/l to about 150 mmol/l, with respect to the titanium content of the catalysts compound. In an embodiment, a positive displacement pump, such as a membrane pump, is used to transfer the catalyst slurry to the slurry polymerization reactor.

Catalysts of the Ziegler type are polymerized in the presence of aluminum alkyl co-catalyst activators. The aluminum alkyls may be selected from trialkylaluminum compound, or the aluminum alkyls may be trimethylaluminum (TMA), triethylaluminum (TEAL), tri-isobutylaluminum (TIBAL), isoprenylaluminum (IPRA), or tri-n-hexylaluminum (TNHAL). In an embodiment, the aluminum alkyl is TEAL.

Fresh aluminum alkyl can be added to the slurry reactor. The aluminum alkyl may be added by first mixing the aluminum alkyl with the diluent used, such as hexane, in a mixing tank. In an embodiment, the concentration of aluminum alkyl in the solution pumped to the slurry polymerization reactor is from about 50 mmol/l to about 600 mmol/l. A positive displacement pump, such as a membrane pump, may be used to transfer the aluminum alkyl to the slurry polymerization reactor.

The aluminum alkyls fed to the polymerization reactor are partially consumed in the ethylene polymerization reactions. The aluminum alkyl co-catalyst activates the Ti or V sites on the catalyst or can be partially deactivated by reaction with oxygen-containing polar compounds that enter the slurry polymerization reactor with the ethylene or other feed streams like hexane, 1-butene and hydrogen. The concentration of aluminum alkyl in the recycled suspension medium can be lower than that from fresh aluminum alkyls of the same type and concentration.

The ethylene for use in the ethylene slurry polymerization process is first passed through an ethylene purification unit before being fed to the two or more polymerization reactors of the reactor cascade. The ethylene stream may contain impurities. Depending on the source of the ethylene, the quality of the ethylene feed stream supplied to the polymerization process prior to purification can vary in amount and composition of the impurities.

Typical ethylene impurities are oxygen-containing polar molecules or acetylene. Such oxygen-containing polar molecules include water, alcohols, glycols, phenols, ethers, carbonyl compounds such as ketones, aldehydes, carboxylic acids, esters, fatty acids, and sulfur dioxides and trioxides, and carbonyl sulfide.

Impurities in polymerization grade ethylene can include carbon monoxide, which may be in a range of about 0.1 to about 2 ppm or more; carbon dioxide, which may be in a range of about 0.5 to about 3 ppm or more; oxygen, which may be in a range of about 0.2 to about 2 ppm or more; acetylene, which may be in a range of about 0.5 to about 5 ppm or more; and water, which may be in a range of about 0.5 to about 5 ppm or more, based on the ethylene stream and expressed as ppm by volume.

The ethylene stream may also contain secondary impurities selected from COS, $H_2S$, $CS_2$; polar organic compounds such as oxygenated hydrocarbons including alcohols, aldehydes, ketones, ethers, peroxides, and glycols; mercaptans; and nitrogen-based molecules such as ammonia, amines or nitrites; or mixtures thereof. The secondary impurities can be present in an amount from about 0.01 to about 10 ppm by volume.

By passing the ethylene through an ethylene purification unit, the total quantity of impurities in the ethylene feed stream is reduced and the level of impurities dosed to the polymerization can be maintained.

In an embodiment of the present disclosure, the ethylene feed stream is purified in sequential purification steps. The ethylene purification unit may comprise four process steps through which the ethylene flows sequentially prior to entering the reactors. The first process step may be the reaction of impurities in the ethylene stream with an oxygen-reduction catalyst. The oxygen-reduction catalyst may be selected from CuO, or alumina-based catalysts of nickel, palladium or platinum. The oxygen-reduction catalyst may be CuO. Hydrogen may be also used in the first process step to hydrogenate acetylene to ethylene or ethane in the presence of the oxygen-reducing catalyst. The hydrogen flow also maintains the CuO catalyst in a reduced state. The first process step may take place in a column which may be a closed vessel constructed of materials consistent with the temperature and pressure of the ethylene stream and arranged to house the oxygen-reduction catalyst and distribute flow of the ethylene stream to achieve contact with the oxygen-reduction catalyst. The ethylene stream becomes depleted in oxygen and acetylene concentration as it progresses through the first column. It then exits the first column as the first process step product stream and enters the second process step.

The second process step may be the reaction of impurities in the ethylene stream with a carbon monoxide-reduction catalyst which oxidizes CO to $CO_2$. The carbon monoxide-reduction catalyst may be selected from $CuO_2$, copper chromite, $Au/CeO_2$ or oxides of Pt, Pd, Ag, V, Cr, Mn, Fe, Co, or Ni, optionally supported on alumina. The carbon monoxide-reduction catalyst may be $CuO_2$. The second process step may take place in a second column which may be a closed vessel constructed of materials consistent with the temperature and pressure of the first process step product stream, and is arranged to house the carbon monoxide-reduction catalyst and distribute flow of the first process step product stream to achieve good contact with the carbon monoxide-reduction catalyst. The first process step product stream becomes depleted in carbon monoxide concentration as it progresses through the second column. It then exits the second process step as the second process step product stream and enters the third process step. When the carbon monoxide-reduction catalyst is $CuO_2$, the oxidation reactions catalyzed by $CuO_2$ will progressively convert the $CuO_2$ catalyst to CuO. Thus, periodically, the $CuO_2$ catalyst in the second column must be regenerated with oxygen.

The third process step may reduce water and $CO_2$, including the $CO_2$ produced in the second process step by contacting the ethylene stream with a water-reduction catalyst that may be selected from molecular sieves.

Molecular sieves are synthetically-produced zeolites, a crystalline form of alkali metal aluminosilicates, and have high structural consistency. The molecular sieves can be activated to obtain adsorbent properties by eliminating their hydration water. The resulting material is highly porous with a strong affinity for water, specific gases and liquids.

Molecular sieves may be classified as desiccant types 3A, 4A, 5A or 13X, which differentiate the molecular sieves by zeolite (potassium-, sodium- or calcium-based) and pore diameter. The different classifications may also correspond to the adsorption of particular compounds.

In the third process step, both water and $CO_2$ may react with the molecular sieve, where the water and $CO_2$ are adsorbed by the molecular sieve.

The third process step may take place in a third column which may be a closed vessel constructed of materials consistent with the temperature and pressure of the third process step product stream and arranged to house the water-reduction catalyst and distribute flow of the third process step product stream to achieve contact with the water-reduction catalyst. The second process product stream becomes depleted in water concentration and carbon dioxide concentration as it progresses through the third column. It then exits the third process step as the third process step product stream and enters the fourth process step.

In the fourth process step, the ethylene stream may be contacted with at least one activated alumina catalyst. Activated aluminas are synthetically produced amorphous oxides from aluminum trihydrate. Activated alumina's may be used to reduce the concentrations of secondary impurities such as COS, $H_2S$, $CS_2$; polar organic compounds such as oxygenated hydrocarbons including alcohols, aldehydes, ketones, ethers, peroxides, glycols; mercaptans; and nitrogen-based molecules such as ammonia, amines, nitrites or mixtures thereof.

In the fourth process step, the secondary impurities may be adsorbed onto the active alumina. The fourth process step may take place in a fourth column which may be a closed vessel constructed of materials consistent with the temperature and pressure of the third process step product stream and arranged to house the activated alumina catalyst and distribute flow of the third process step product stream to achieve contact with the activated alumina catalyst. The third process step product stream becomes depleted in secondary impurities as it progresses through the fourth column. It exits the fourth process step as the fourth step product stream, and enters a reactor. Activated aluminas for use in the fourth process step include Selexsorb® CD, Selexsorb® AS and Selexsorb® COS, commercially available from BASF.

In an embodiment, the ethylene stream exiting the fourth process step and entering the reactor may have a carbon monoxide concentration of at most about 0.09 ppm by volume. In some embodiments, the ethylene stream has a concentration of at most about 0.06 ppm by volume. In other embodiments, the ethylene stream has a concentration of, or at most about 0.03 ppm by volume;

In an embodiment, the ethylene stream exiting the fourth process step and entering the reactor may have a carbon dioxide concentration of at most about 0.9 ppm by volume. In some embodiments, the ethylene stream has a concentration of at most about 0.5 ppm by volume. In other embodiments, the ethylene stream has a concentration of at most about 0.1 ppm by volume.

In an embodiment, the ethylene stream exiting the fourth process step and entering the reactor may have an oxygen concentration of at most about 0.9 ppm by volume. In some embodiments, the ethylene stream has a concentration of at most about 0.5 ppm by volume. In other embodiments, the ethylene stream has a concentration of at most about 0.1 ppm by volume.

In an embodiment, the ethylene stream exiting the fourth process step and entering the reactor may have an acetylene concentration of at most about 2.7 ppm by volume. In some embodiments, the ethylene stream has a concentration of at most about 1.8 ppm by volume. In other embodiments, the ethylene stream has a concentration of at most about 1.0 ppm by volume.

In an embodiment, the ethylene stream exiting the fourth process step and entering the reactor may have a water concentration of at most about 1.8 ppm by volume. In some embodiments, the ethylene stream has a concentration of at most about 1.0 ppm by volume. In other embodiments, the ethylene stream has a concentration of at most about 0.1 ppm by volume.

In an embodiment of the present disclosure, the $C_3$ to $C_{10}$ alpha-olefins are first passed through an olefin purification unit to reduce the concentration of carbon monoxide, carbon dioxide, oxygen, acetylene and water contained in the olefins, before being fed to the two or more polymerization reactors of the reactor cascade.

In an embodiment, the resulting polyethylene can be bimodal or multimodal.

In an embodiment, the polyethylene polymers produced by the polymerization process may be used for preparing films, pipes or blow molding polyethylene articles. Accordingly, the present disclosure also provides processes for preparing films, pipes or blow molding polyethylene articles, in which a polyethylene is prepared by a process presently-disclosed.

In some embodiments, the process for preparing films, pipes or blow-molded articles including the steps of:
a) preparing a polyethylene in a reactor cascade of two or more polymerization reactors including the steps of:
  (i) to a first polymerization reactor, feeding a first set of components made from or containing
    A) a first amount of ethylene,
    B) a first amount of a Ziegler catalyst,
    C) a first amount of a fresh aluminum alkyl, and
    D) a first amount of a diluent;
  (ii) contacting the first set of components in the first polymerization reactor at a reactor temperature from about 60° C. to about 95° C. and a reactor pressure from about 0.15 MPa to about 3 MPa, thereby forming a first slurry product made from or containing particulate polyethylene and a suspension medium;
  (iii) withdrawing the first slurry product from the first polymerization reactor;
  (iv) to a second polymerization reactor, feeding a second set of components made from or containing
    A) the first slurry product,
    B) a second amount of ethylene, and
    C) a second amount of diluent;
  (v) contacting the second set of components in the second polymerization reactor at a reactor temperature from about 60° C. to about 95° C. and a reactor pressure from about 0.15 MPa to about 3 MPa, thereby forming a second slurry product made from or containing particulate polyethylene and a suspension medium; and
  (vi) withdrawing the second slurry product from the second polymerization reactor,
  wherein (i) prior to passing through an ethylene purification unit, the ethylene contains an impurity selected from the group consisting of carbon monoxide, carbon dioxide, oxygen, acetylene, and water and (ii) before the ethylene is fed to the two or more polymerization reactors of the reactor cascade, the ethylene is passed through an ethylene purification unit and the concentration of the impurity is reduced; and b) forming an article selected from the group consisting of films, pipes, and blow-molded articles.

What is claimed is:

1. A slurry polymerization process for the preparation of polyethylene in a reactor cascade of two or more polymerization reactors comprising the steps of:
   a) to a first polymerization reactor, feeding a first set of components comprising
      (i) a first amount of ethylene,
      (ii) a first amount of a Ziegler catalyst,
      (iii) a first amount of a fresh aluminum alkyl, and
      (iv) a first amount of a diluent;
   b) contacting the first set of components in the first polymerization reactor at a reactor temperature from about 60° C. to about 95° C. and a reactor pressure from about 0.15 MPa to about 3 MPa, thereby forming a first slurry product comprising particulate polyethylene and a suspension medium;
   c) withdrawing the first slurry product from the first polymerization reactor;
   d) to a second polymerization reactor, feeding a second set of components comprising
      (i) the first slurry product,
      (ii) a second amount of ethylene, and
      (iii) a second amount of diluent;
   e) contacting the second set of components in the second polymerization reactor at a reactor temperature from about 60° C. to about 95° C. and a reactor pressure from about 0.15 MPa to about 3 MPa, thereby forming a second slurry product comprising particulate polyethylene and a suspension medium; and
   f) withdrawing the second slurry product from the second polymerization reactor,
   g) feeding the second slurry product to a post reactor,
   h) maintaining the second slurry product in the post reactor at a reactor temperature from about 60° C. to about 95° C. and a reactor pressure from about 0.15 MPa to about 3 MPa, thereby forming a modified second slurry product comprising an additional amount of polyethylene and a suspension medium; and
   i) withdrawing the modified second slurry product from the post reactor;
wherein (i) prior to passing through an ethylene purification unit, the ethylene comprises an impurity selected from the group consisting of carbon monoxide, carbon dioxide, oxygen, acetylene, and water and (ii) before the ethylene is fed to the two or more polymerization reactors of the reactor cascade, the ethylene is passed through an ethylene purification unit and the concentration of the impurity is reduced.

2. The process of claim 1, wherein the ethylene fed to the polymerization reactors has a carbon monoxide concentration of at most about 0.09 ppm by volume.

3. The process of claim 1, wherein the ethylene fed to the polymerization reactors has a carbon dioxide concentration of at most about 0.9 ppm by volume.

4. The process of claim 1, wherein the ethylene fed to the polymerization reactors has an oxygen concentration of at most about 0.9 ppm by volume.

5. The process of claim 1, wherein the ethylene fed to the olymerization reactors has an acetylene concentration of at most about 2.7 ppm by volume.

6. The process of claim 1, wherein the ethylene fed to the polymerization reactors has a water concentration of at most about 1.8 ppm by volume.

7. The process of claim 1, wherein the ethylene purification comprises a first process step comprising contacting the ethylene with a catalyst reducing the concentration of oxygen in the ethylene, a second process step comprising contacting the ethylene with a catalyst reducing the concentration of carbon monoxide in the ethylene, a third process step comprising contacting the ethylene with a molecular sieve and a fourth process step comprising contacting the ethylene with an activated alumina.

8. The process of claim 1, wherein one or more $C_3$ to $C_{10}$ alpha-olefins are fed to the two polymerization reactors and the $C_3$ to $C_{10}$ alpha-olefins are first passed through an olefin purification unit to reduce the concentration of carbon monoxide, carbon dioxide, oxygen, acetylene and water in the olefins fed to the two polymerization reactors of the reactor cascade.

9. The process of claim 1, wherein the aluminum alkyl is trimethylaluminum, triethylaluminum, tri-isobutylaluminum, isoprenylaluminum, or tri-n-hexylaluminum.

10. The process of claim 1, wherein the diluent fed to the first reactor of the reactor cascade is fresh diluent.

11. The process of claim 1, wherein the polyethylene has a density in the range of from about 0.935 $g/cm^3$ to about 0.970 $g/cm^3$.

12. The process of claim 1, wherein the polyethylene is a bimodal or multimodal polyethylene.

13. A process for preparing films, pipes or blow molded articles comprising the steps of:
   a) preparing a polyethylene in the slurry polymerization process of claim 1; and
   b) forming an article selected from the group consisting of films, pipes, and blow-molded articles.

14. A slurry polymerization process for the preparation of polyethylene in a reactor cascade of three polymerization reactors comprising the steps of:
   a) to a first polymerization reactor, feeding a first set of components comprising
      (i) a first amount of ethylene,
      (ii) a first amount of a Ziegler catalyst,
      (iii) a first amount of a fresh aluminum alkyl, and
      (iv) a first amount of a diluent;
   b) contacting the first set of components in the first polymerization reactor at a reactor temperature from about 60° C. to about 95° C. and a reactor pressure from about 0.15 MPa to about 3 MPa, thereby forming a first slurry product comprising particulate polyethylene and a suspension medium;
   c) withdrawing the first slurry product from the first polymerization reactor;
   d) to a second polymerization reactor, feeding a second set of components comprising
      (i) the first slurry product,
      (ii) a second amount of ethylene, and
      (iii) a second amount of diluent;
   e) contacting the second set of components in the second polymerization reactor at a reactor temperature from about 60° C. to about 95° C. and a reactor pressure from about 0.15 MPa to about 3 MPa, thereby forming a second slurry product comprising particulate polyethylene and a suspension medium; and
   f) withdrawing the second slurry product from the second polymerization reactor,
   g) to a third polymerization reactor, feeding a third set of components comprising
      (i) the second slurry product,
      (ii) a third amount of ethylene, and
      (iii) a third amount of diluent;
   h) contacting the third set of components in the third polymerization reactor at a reactor temperature from about 60° C. to about 95° C. and a reactor pressure from about 0.15 MPa to about 3 MPa, thereby forming an additional amount of polyethylene in the slurry product comprising particulate polyethylene and a suspension medium; and i) withdrawing the third slurry product from the third polymerization reactor;

j) feeding the third slurry product to a post reactor, k) maintaining the third slurry product in the post reactor at a reactor temperature from about 60° C. to about 95° C. and a reactor pressure from about 0.15 MPa to about 3 MPa, thereby forming a modified third slurry product comprising an additional amount of polyethylene and a suspension medium; and I) withdrawing the modified third slurry product from the post reactor;

wherein (i) prior to passing through an ethylene purification unit, the ethylene comprises an impurity selected from the group consisting of carbon monoxide, carbon dioxide, oxygen, acetylene, and water and (ii) before the ethylene is fed to the three polymerization reactors of the reactor cascade, the ethylene is passed through an ethylene purification unit and the concentration of the impurity is reduced.

15. The process of claim 14, wherein one or more $C_3$ to $C_{10}$ alpha-olefins are fed to the three polymerization reactors and $C_3$ to $C_{10}$ alpha-olefins are first passed through an olefin purification unit to reduce at least the concentration of carbon monoxide, carbon dioxide, oxygen, acetylene and water in the olefins fed to the three polymerization reactors of the reactor cascade.

16. A process for preparing films, pipes or blow-molded articles comprising the steps of:
 a) preparing a polyethylene in the slurry polymerization process of claim 14; and
 b) forming an article selected from the group consisting of films, pipes, and blow-molded articles.

* * * * *

UNITED STATES PATENT AND TRADEMARK OFFICE
CERTIFICATE OF CORRECTION

PATENT NO. : 10,047,176 B2
APPLICATION NO. : 15/503299
DATED : August 14, 2018
INVENTOR(S) : Meier et al.

Page 1 of 1

It is certified that error appears in the above-identified patent and that said Letters Patent is hereby corrected as shown below:

In the Specification

In Column 5, Line 47, delete "in in" and insert -- in --
In Column 13, Line 21, delete "alumina's" and insert -- aluminas --
In Column 13, Line 49, delete "volume;" and insert -- volume. --

In the Claims

In Column 15, Claim 5, Line 60, delete "olymerization" and insert -- polymerization --

Signed and Sealed this
Eleventh Day of January, 2022

Drew Hirshfeld
*Performing the Functions and Duties of the
Under Secretary of Commerce for Intellectual Property and
Director of the United States Patent and Trademark Office*